US008824031B2

(12) United States Patent
Metcalfe et al.

(10) Patent No.: US 8,824,031 B2
(45) Date of Patent: Sep. 2, 2014

(54) METHOD AND APPARATUS FOR OBJECT ASSISTED IMAGE EDITING AND TRANSMISSION OF SCANNED DOCUMENTS

(75) Inventors: David Jon Metcalfe, Marion, NY (US); Mihai Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 139 days.

(21) Appl. No.: 13/535,859

(22) Filed: Jun. 28, 2012

(65) Prior Publication Data

US 2014/0002866 A1    Jan. 2, 2014

(51) Int. Cl.
*G06K 9/34* (2006.01)
*G06K 9/03* (2006.01)
*H04N 1/46* (2006.01)

(52) U.S. Cl.
USPC ............ 358/538; 382/171; 382/176; 382/311

(58) Field of Classification Search
USPC ........... 358/538, 1.9, 540; 382/164, 173–179, 382/190, 311; 715/246, 255, 865–866, 274; 345/619, 623, 625
See application file for complete search history.

(56) References Cited

U.S. PATENT DOCUMENTS

| 6,920,250 | B1 | 7/2005 | Kletter et al. |
| 7,218,784 | B1 | 5/2007 | Zeek et al. |
| 7,277,191 | B2 | 10/2007 | Metcalfe et al. |
| 7,382,919 | B2 | 6/2008 | Eschbach et al. |
| 7,724,955 | B2 | 5/2010 | Metcalfe et al. |
| 2003/0058939 | A1* | 3/2003 | Lee et al. ................. 375/240.08 |
| 2004/0146198 | A1* | 7/2004 | Herley ........................ 382/173 |
| 2009/0110277 | A1* | 4/2009 | Birtles et al. .................. 382/173 |

* cited by examiner

*Primary Examiner* — Barbara Reinier

(57) ABSTRACT

A method, non-transitory computer readable medium, and apparatus for transmitting an object from a scanned document are disclosed. For example, the method receives a scanned document, automatically segments one or more objects from the scanned document, presents the scanned document to the user, wherein the scanned document is modified to visually identify the one or more objects that are automatically segmented, receives a selection of an object of the one or more objects that are automatically segmented and transmits the object that is selected.

18 Claims, 5 Drawing Sheets

METHOD AND APPARATUS FOR OBJECT ASSISTED IMAGE EDITING AND TRANSMISSION OF SCANNED DOCUMENTS

The present disclosure relates generally to manipulating scanned documents and, more particularly, to a method and apparatus for object assisted image editing and transmission of scanned documents.

BACKGROUND

Currently, to edit an image from a scanned document, a user must manually crop an image. However, manually cropping an image is time consuming and inefficient. In addition, manually cropping an image usually picks up collateral text and/or objects that are undesirable. In other words, it is difficult to isolate an image by manually cropping the image.

Some image segmentation algorithms exist for smart printing. The image segmentation algorithms process an image to analyze particular characteristics of the image to determine an optimal print. For example, the analysis may determine that the text could be sharpened, the halftone regions could be classified and appropriately low-pass filtered and isolated photographs could be precisely enhanced to optimize printing. However, the image segmentation algorithms do not allow for editing and manipulation of the image.

SUMMARY

According to aspects illustrated herein, there are provided a method, a non-transitory computer readable medium, and an apparatus for transmitting an object from a scanned document. One disclosed feature of the embodiments is a method that receives a scanned document, automatically segments one or more objects from the scanned document, presents the scanned document, wherein the scanned document is modified to visually identify the one or more objects that are automatically segmented, receives a selection of an object of the one or more objects that are automatically segmented and transmits the object that is selected.

Another disclosed feature of the embodiments is a non-transitory computer-readable medium having stored thereon a plurality of instructions, the plurality of instructions including instructions which, when executed by a processor, cause the processor to perform a method that receives a scanned document, automatically segments one or more objects from the scanned document, presents the scanned document, wherein the scanned document is modified to visually identify the one or more objects that are automatically segmented, receives a selection of an object of the one or more objects that are automatically segmented and transmits the object that is selected.

Another disclosed feature of the embodiments is an apparatus comprising a processor that is configured to receives a scanned document, automatically segments one or more objects from the scanned document, presents the scanned document to the user, wherein the scanned document is modified to visually identify the one or more objects that are automatically segmented, receives a selection of an object of the one or more objects that are automatically segmented and transmits the object that is selected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for transmitting an object from a scanned document. As discussed above, manually cropping an image from a scanned document is a time consuming and inefficient process. In addition, currently used segmentation algorithms only provide information for optimal printing.

One embodiment of the present disclosure utilizes the image segmentation algorithms to provide more efficient object editing of a scanned document. In addition, an object from the segmented objects may be selected and transmitted, e.g., to another end point device directly from a multi-function device that scanned and segmented the document.

Figure 1:
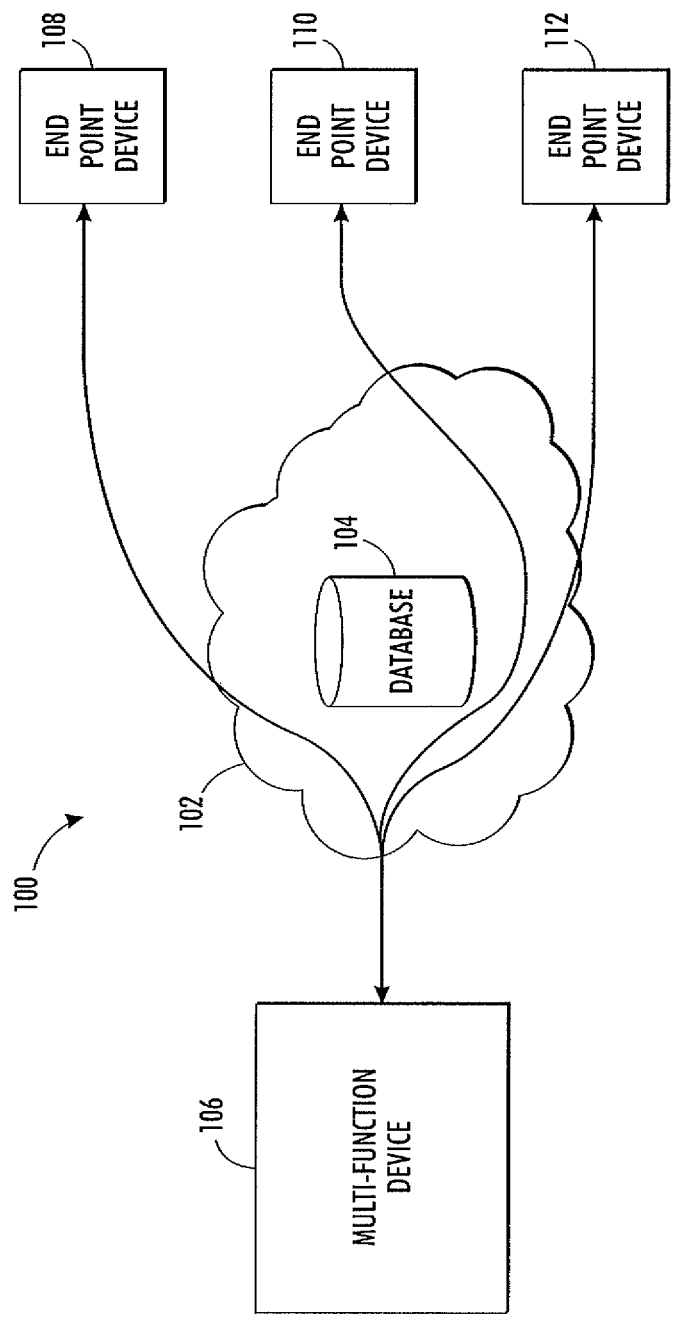
FIG. 1 illustrates one example of a communication network of the present disclosure.

To better understand the present disclosure, FIG. 1 illustrates an example of a communication network 100. In one embodiment, the communication network 100 includes a packet network such as an Internet Protocol (IP) network 102. The IP network 102 may be, for example, the Internet, a service provider network, an access network, a core network, a local area network, and the like.

In one embodiment, a multi-function device 106 may be in communication with the IP network 102. In one embodiment, the multi-function device 106 may include general personal computing capabilities similar to the general computing device described below and illustrated in FIG. 5. In one embodiment, the multi-function device 106 may include digital image processing capability, electronic communication capability (e.g., email transmission, electronic file transmission, and the like), scanning capability, faxing capability, copying capability, printing capability, a graphical user interface with or without a touch screen, one or more input and output devices, and the like.

In one embodiment, the multi-function device 106 may be configured to automatically segment one or more objects of a scanned document. The segmentation algorithms may automatically segment objects from a scanned document and exclude any collateral image content. In other words, only the identified objects are included in the segmentation.

In addition, the segmentation algorithm may collect various statistics about each object that is segmented. For example, statistics may include size of the object, color of the object, chroma values of the object, and the like. Examples of the segmentation algorithms that can be used may be found in U.S. Pat. Nos. 7,277,191 and 7,724,955 assigned to Xerox Corporation and are hereby incorporated by reference in their entirety.

In one embodiment, the multi-function device 106 may be in communication with a database (DB) 104. In one embodiment, the DB 104 may be located remotely from the multi-function device 106. For example, the DB 104 may be located in the IP network 102, as illustrated in FIG. 1. In another embodiment, the DB 104 may be located at another location within an enterprise (e.g., a different building) using the multi-function device 106. In another embodiment, the DB 104 may be remotely located at a third party location.

In one embodiment, the multi-function device 106 may be in communication with one or more endpoint devices 108, 110 and 112 via the IP network 102. The one or more endpoint devices 108, 110 and 112 may be any device capable of communicating with the multi-function device 106, such as for example, a personal computer, a lap top computer, a tablet device, a smartphone, a cellular phone, a netbook, and the like. Although three endpoint devices 108, 110 and 112 are illustrated in FIG. 1, it should be noted that any number of endpoint devices may be deployed.

It should be noted that the network 100 has been simplified for clarity. For example, the network 100 may include other network elements such as border elements, routers, switches, policy servers, security devices, firewalls, a content distribution network (CDN) and the like. In addition, the network 100 may include additional networks between the endpoint devices and the IP network 102 such as different access networks (e.g., a wired access network, a cable network, a wireless network, a cellular network, a Wi-Fi network, and the like) to reach the IP network 102.

Figure 2:
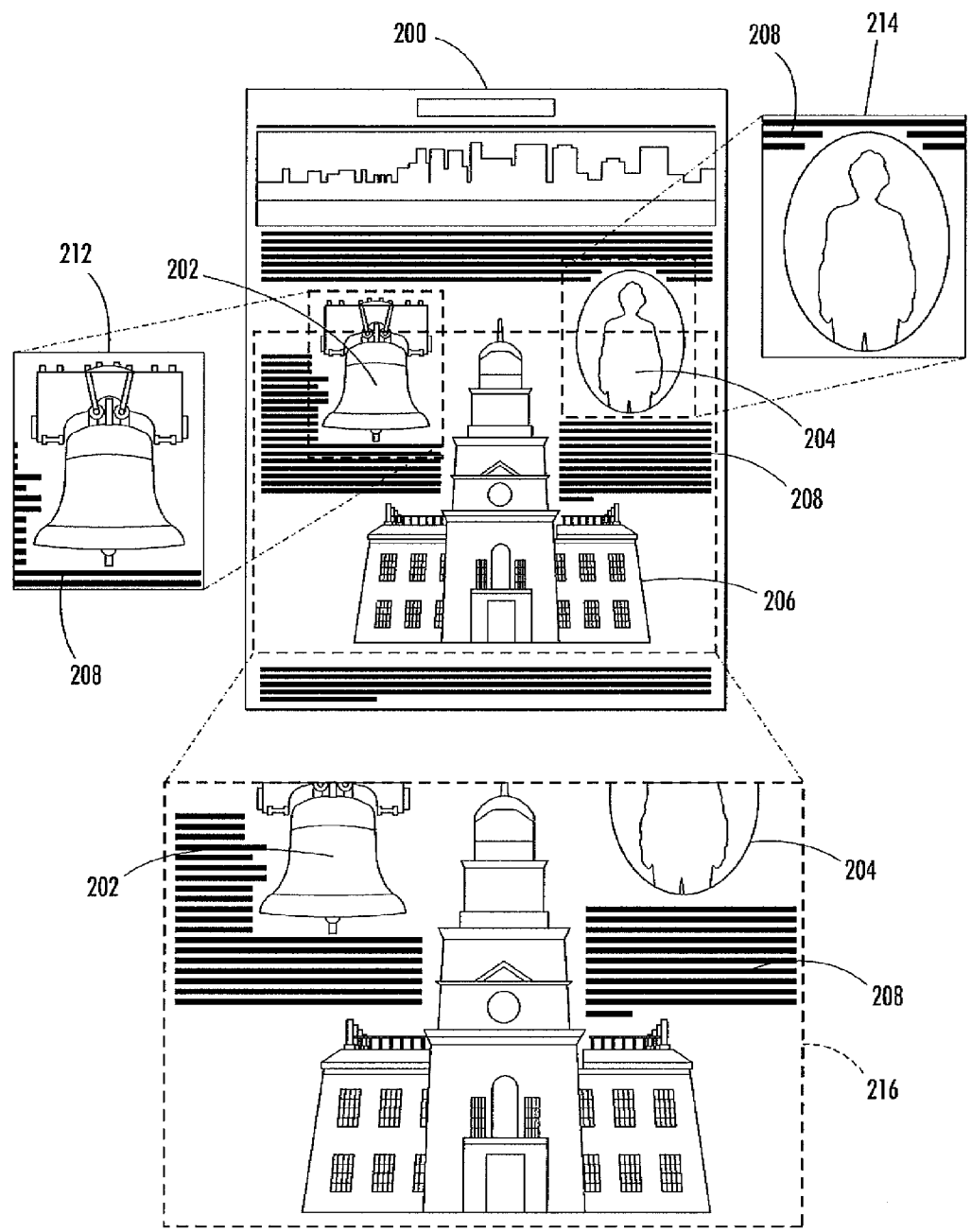
FIG. 2 illustrates an example of segmented objects of a scanned document.

FIG. 2 illustrates an example of a scanned document 200 processed by the multi-function device 106 i.e., to provide one or more segmented objects. As discussed above, the multi-function device 106 may be capable of automatically segmenting one or more objects from the scanned document 200.

In one embodiment, the scanned document 200 may include objects 202, 204 and 206. Within the scanned document 200 surrounding the objects 202, 204 and 206 may be alphanumeric text 208.

Previously, a user was required to manually crop or segment each of the objects 202, 204 and 206. As a result, the segmented objects would include collateral image content. FIG. 2 illustrates examples of collateral image content in segmented objects 212, 214 and 216. For example, the segmented object 212 includes some collateral image content in the form of the alphanumeric text 208 that is considered to be collateral image content. The segmented object 214 also has some alphanumeric text 208. The segmented object 216 includes collateral image content in the form of the alphanumeric text 208 and portions of the objects 202 and 204.

In one embodiment, the automatic segmentation algorithm of the multi-function device 106 may automatically segment the objects 202, 204 and 206 and exclude all of the collateral image content (e.g., the alphanumeric text 208 or portions of the objects 202 and 204) from the segmented objects 212, 214 and 216. In other words, the automatic segmentation algorithm may segment the objects 202, 204 and 206 such that the segmented objects 212, 214 and 216 only include content that is part of the objects 202, 204 and 206 and no additional content. This helps to minimize the size of the segmented objects 212, 214 and 216 and increase efficiency in transmitting the segmented object to the DB 104 or another endpoint device 108, 110 or 112.

Figure 3:
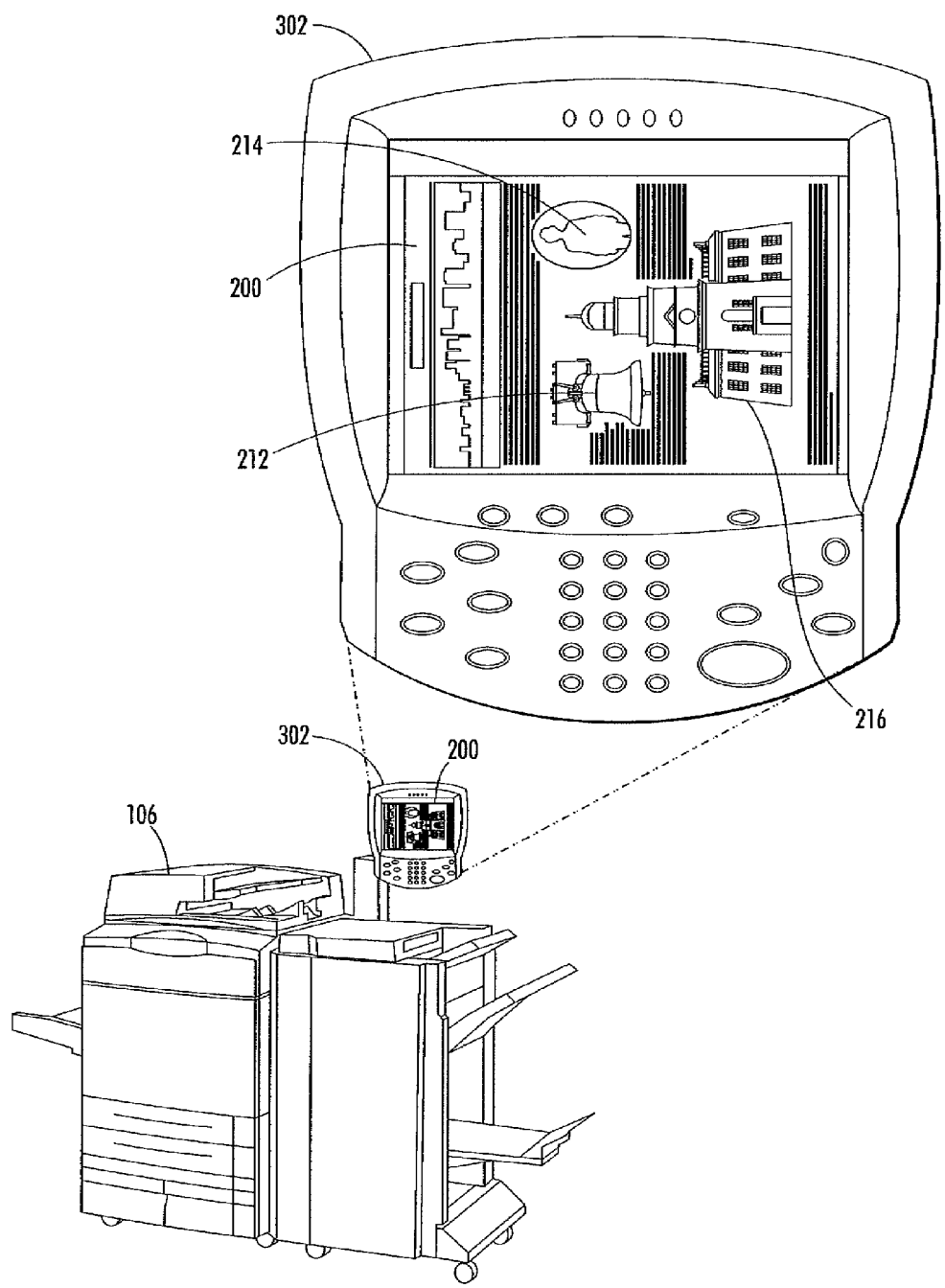
FIG. 3 illustrates an example of a graphical user interface presenting the segmented objects of the scanned document.

FIG. 3 illustrates one embodiment of a graphical user interface (GUI) 302 of the multi-function device 106 for presenting the scanned document 200 to a user. In one embodiment, the GUI 302 may present the scanned document 200 with the segmented objects 212, 214 and 216. Although only three segmented objects 212, 214 and 216 are illustrated in FIG. 3, it should be noted that the scanned document 200 may include any number of segmented objects. As discussed above, the multi-function device 106 may scan a document and automatically segment the objects of the scanned document 200 such that the segmented objects 212, 214 and 216 include no collateral image content.

In other words, when a user selects the segmented object 212, the segmented object 212 will only include the image of the Liberty Bell and no other surrounding alphanumeric text or portions of other objects.

In one embodiment, the segmented objects 212, 214 and 216 may be highlighted or brought to the foreground in the GUI 302, while all other images (e.g., non-segmented objects or alphanumeric text) are faded to the background. As a result, a user may easily identify which segmented objects are selectable for editing, storing, transmitting, and the like. In one embodiment, the GUI 302 may be a touch screen and the user may simply select a segmented object by touching the desired segmented object.

In one embodiment, after the user has selected one of the segmented objects 212, 214 or 216, the user may directly transmit the selected segmented object to a storage device (e.g., the DB 104) or another endpoint device (e.g., endpoint device 108, 110 or 112). For example, the user may select or enter an email address of a second user associated with the endpoint device 108. The multi-function device 106 may then compress and transmit the selected segmented object to the endpoint device 108.

Notably, the selection and transmission of the segmented object all occurs from the multi-function device 106. In other words, the user is not required to send the scanned document from the multi-function device 106 to a personal computer (PC) and then segment and transmit an object from the user's PC. Alternatively, the user is not required to save the segmented objects 212, 214 and 216 to a separate file and then create an email and attach the segmented objects 212, 214 and 216 from the saved files. Rather, in one embodiment of the present disclosure, the user may simply select a segmented object directly from the scanned document presented to the user and transmit the selected segmented object to a desired destination.

In one embodiment, as noted above, the multi-function device 106 may compress the segmented object before transmission. In one embodiment, the multi-function device 106 may select an optimal compression algorithm based upon characteristics of the selected segmented object. For example, if an object is determined to have more monochrome characteristics, the chroma components could be more aggressively compressed. In other words, the compression ratio may be individually and uniquely "tuned" based upon the segmentation.

In one embodiment, multi-function device 106 may automatically determine whether or not to compress the file based upon a type of object and a quality of the object that is selected. For example, if the segmented object is a high quality photograph where compression would be undesirable, the user may not want the object to be compressed. However, if the segmented object is a grey tone image, the user may not care if the object is compressed. A few examples of compression algorithms that may be used may include compression algorithms disclosed in U.S. Pat. Nos. 6,920,250 and 7,218,784 assigned to Xerox Corporation and hereby incorporated by reference in their entirety. Compression may be an optional step.

In one embodiment, the user may send multiple different segmented objects to different endpoint devices directly from the scanned document 200 on the GUI 302. For example, the user may select the segmented object 212 directly from the scanned document 200 presented in the GUI 302 and transmit it to the endpoint device 108. The user may then select the segmented object 214 directly from the scanned document 200 presented in the GUI 302 and transmit it to the endpoint devices 110 and 112. The user may then select the segmented object 216 directly from the scanned document 200 presented in the GUI 302 and transmit it to the DB 104, and so forth.

Figure 4:
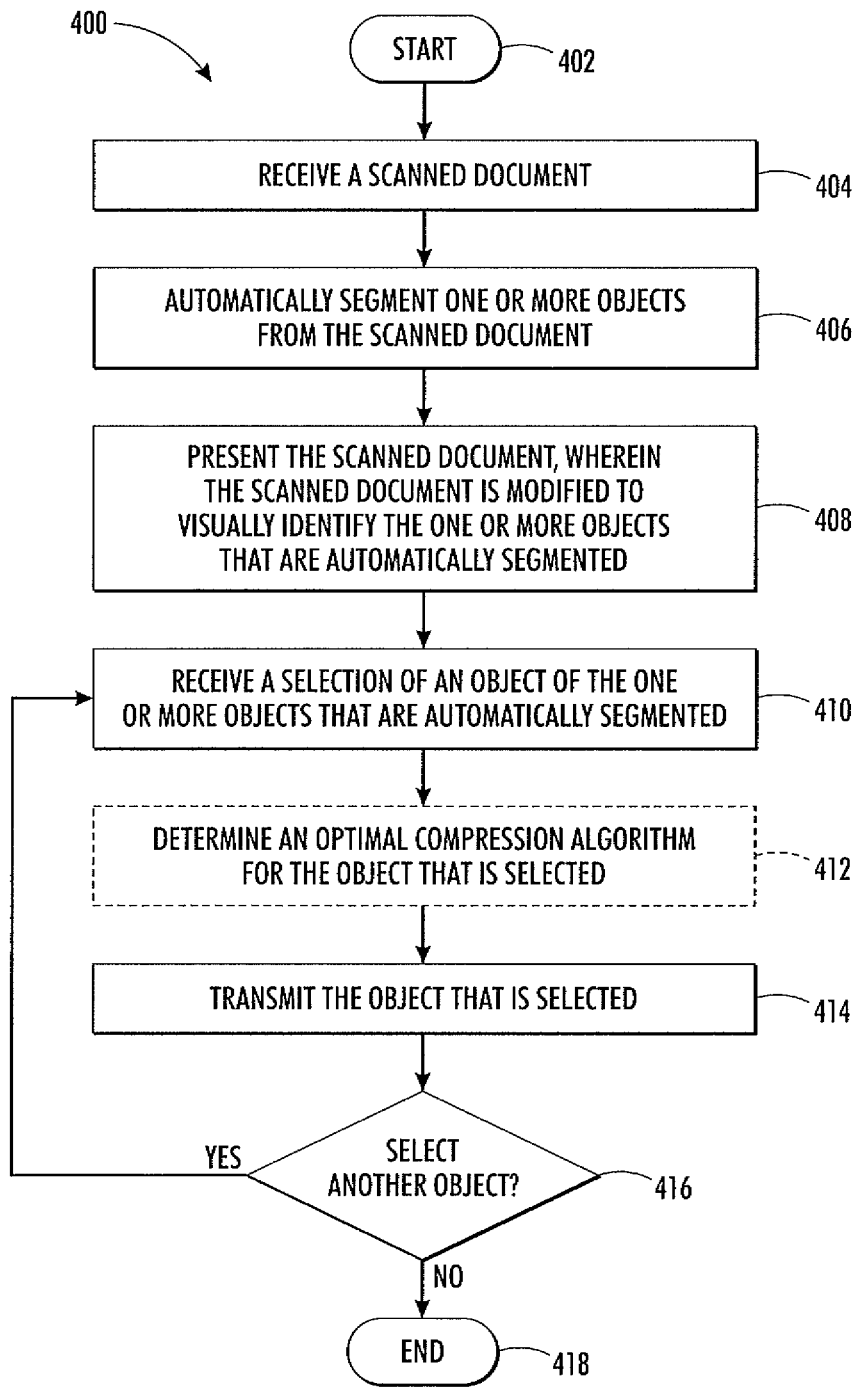
FIG. 4 illustrates an example flowchart of one embodiment of a method for transmitting an object from a scanned document.
Figure 5:
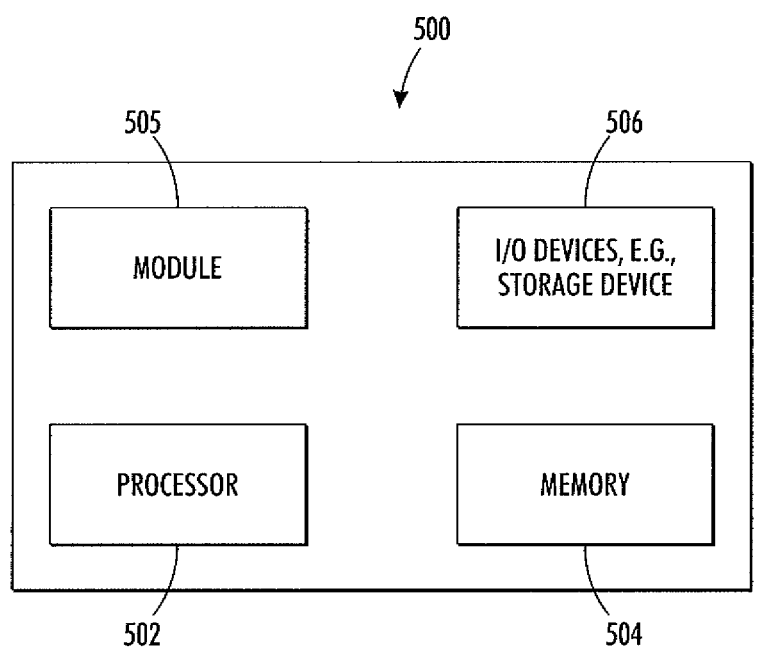
FIG. 5 illustrates a high-level block diagram of a general-purpose computer suitable for use in performing the functions described herein.

FIG. 4 illustrates a flowchart of a method 400 for transmitting an object from a scanned document. In one embodiment, the method 400 may be performed by the multi-function device 106 or a general purpose computer as illustrated in FIG. 5 and discussed below.

The method 400 begins at step 402. At step 404, the method 400 receives a scanned document. For example, a document may be scanned by a multi-function device.

At step 406, the method 400 automatically segments one or more objects from the scanned document. For example, the document may include various images, pictures, graphs, and the like, apart from the alphanumeric text. In one embodiment, the method 400 may use a segmentation algorithm to automatically segment objects from a scanned document and exclude any collateral image content. In other words, only one object is included in each of the segmentations.

The segmentation algorithm may also collect various statistics about each object that is segmented. For example, statistics may include size of the object, color of the object, chroma values of the object, and the like. The collected statistics and information about the segmented object may be used for selecting optimal compression, storage, transmission, and the like, as discussed below. Examples of the segmentation algorithms that can be used may be found in U.S. Pat. Nos. 7,277,191 and 7,724,955 assigned to Xerox Corporation and hereby incorporated by reference in their entirety.

At step 408, the method 400 presents the scanned document, wherein the scanned document is modified to visually identify the one or more objects that, are automatically segmented. For example, a multi-function device that scanned the document in step 404 may include a GUI that displays the scanned document and the segmented objects as noted on the scanned document (e.g., via highlighting, shading, associating reference numerals or icons with each of the object, and the like). In one embodiment, the segmented objects may be highlighted or brought to the foreground in the GUI, while all other images (e.g., non-segmented objects or alphanumeric text) are faded to the background. As a result, a user may easily identify which segmented objects are selectable for editing, storing, transmitting, and the like.

At step 410, the method 400 receives a selection of an object of the one or more objects that are automatically segmented. For example, the GUI of the multi-function device may be a touch screen and the user may simply select a segmented object by touching the desired segmented object. In one embodiment, the user may select multiple objects or all of the objects.

In one embodiment, the selection may be performed automatically by the multi-function device. The automatic selection may be based upon user-defined settings and an image size, i.e., the multi-function device may automatically select the object. For example, the user may decide in advance (e.g., via a user profile file or user setting) to select black and white images of people that are less than one megabyte (MB). The multi-function device may analyze each object that is segmented to determine if any of the segmented objects meet the user-defined settings and the image size and automatically select those objects that match the user-defined settings and the image size.

The method 400 may then proceed to optional step 412. In one embodiment, the optional step 412 may determine an optimal compression algorithm for the object that is selected. In one embodiment, an optimal compression algorithm may be selected based upon the statistics and information of the selected segmented object collected at step 406. For example, if an object is determined to have more monochrome characteristics, the chroma components could be more aggressively compressed. In other words, the compression method may be individually and uniquely "tuned" based upon the information relevant to the segmentation of each object.

In one embodiment, the method 400 may determine whether or not to compress the object based upon a type of object and a quality of the object that is selected. For example, if the segmented object is a high quality photograph where compression would be undesirable, the user may not want the object to be compressed. However, if the segmented object is a grey tone image, the user may not care if the object is compressed. A few examples of compression algorithms that can be used may include compression algorithms disclosed in U.S. Pat. Nos. 6,920,250 and 7,218,784 assigned to Xerox Corporation and hereby incorporated by reference in their entirety.

At step 414, the method 400 transmits the object that is selected. For example, the segmented object or objects may be transmitted to another endpoint device via an email, a file transfer protocol (FTP), a short message service (SMS) text message, and the like. In one embodiment, the user may select to transmit the selected segmented object to multiple endpoint devices, for example, via multiple emails to different users. In one embodiment, the selected segmented object may be transmitted to a database or remotely located storage device.

At step 416, the method 400 determines if another object is selected. For example, after the first selected segmented object is transmitted, the user may decide to select and transmit another segmented object to another endpoint device or storage device.

If the user decides to select another object at step 416, the method 400 returns to step 410. The method 400 then repeats steps 410 through 416. However, if another object is not selected at step 416, the method 400 proceeds to step 418. The method ends at step 418.

It should be noted that although not explicitly specified, one or more steps of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for transmitting an object from a scanned document, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for transmitting an object from a scanned document can be loaded into memory 504 and executed by processor 502 to implement the functions as discussed above. As such, the present method 505 for transmitting an object from a scanned document (including associated data structures) of the present disclosure can be stored on a non-transitory computer readable storage medium, e.g., RAM memory, magnetic or optical drive or diskette and the like. For example, the hardware processor 502 can be programmed or configured with instructions (e.g., computer readable instructions) to perform the steps of method 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for transmitting an object from a scanned document, comprising:
   receiving, by a processor, the scanned document, wherein the scanned document comprises a single page having a plurality of different objects surrounded by an alphanumeric text;
   automatically segmenting, by the processor, one or more objects from the plurality of different objects of the single page in the scanned document, wherein the automatically segmenting the one or more objects comprises segmenting to exclude a collateral image content;
   presenting, by the processor, the scanned document, wherein the scanned document is modified to visually identify the one or more objects that are automatically segmented;
   receiving, by the processor, a selection of an object of the one or more objects that are automatically segmented; and
   transmitting, by the processor, the object that is selected.

2. The method of claim 1, wherein the presenting comprises:
   highlighting the one or more objects that are automatically segmented; and
   fading all remaining images and text.

3. The method of claim 1, wherein the presenting is performed by a graphical user interface of a device that received the scanned document.

4. The method of claim 1, further comprising:
   determining a compression algorithm for the object that is selected; and
   transmitting the object that is selected using the compression algorithm.

5. The method of claim 1, wherein the receiving comprises receiving the selection automatically based upon a user defined setting and an image size.

6. The method of claim 1, wherein the transmitting comprises transmitting to at least one of: an end point device as an attachment in an email, or to a storage device.

7. The method of claim 1, wherein the transmitting comprises transmitting to two different devices selected by a user.

8. The method of claim 1, wherein the transmitting is performed by a device that received the scanned document.

9. A non-transitory computer-readable medium storing a plurality of instructions, which when executed by a processor, cause the processor to perform operations for transmitting an object from a scanned document, the operations comprising:
   receiving the scanned document, wherein the scanned document comprises a single page having a plurality of different objects surrounded by an alphanumeric text;
   automatically segmenting one or more objects from the plurality of different objects of the single page in the scanned document, wherein the automatically segmenting the one or more objects comprises segmenting to exclude a collateral image content;
   presenting the scanned document, wherein the scanned document is modified to visually identify the one or more objects that are automatically segmented;
   receiving a selection of an object of the one or more objects that are automatically segmented; and
   transmitting the object that is selected.

10. The non-transitory computer-readable medium of claim 9, wherein the presenting comprises:
    highlighting the one or more objects that are automatically segmented; and
    fading all remaining images and text.

11. The non-transitory computer-readable medium of claim 9, wherein the presenting is performed by a graphical user interface of a device that received the scanned document.

12. The non-transitory computer-readable medium of claim 9, further comprising:
    determining a compression algorithm for the object that is selected; and
    transmitting the object that is selected using the compression algorithm.

13. The non-transitory computer-readable medium of claim 9, wherein the receiving comprises receiving the selection automatically based upon a user defined setting and an image size.

14. The non-transitory computer-readable medium of claim 9, wherein the transmitting comprises transmitting to at least one of: an end point device as an attachment in an email or a storage device.

15. The non-transitory computer-readable medium of claim 9, wherein the transmitting comprises transmitting to two different devices selected by a user.

16. The non-transitory computer-readable medium of claim 9, wherein the transmitting is performed by a device that received the scanned document.

17. A method for transmitting an object from a scanned document, comprising:
    scanning a single page document on a multi-function device, wherein the single page document has a plurality of different images surrounded by an alphanumeric text;
    automatically segmenting a plurality of images from the plurality of different images in the single page document such that all collateral image content is excluded and each one of the plurality of images that is segmented only includes a respective image;
    presenting the single page document on a graphical user interface of the multi-function device, wherein the single page document is modified to visually identify the plurality of images that is automatically segmented;
    receiving a selection of an image of the plurality of images that is automatically segmented;
    determining a compression algorithm for the image that is selected based upon characteristics of the image obtained during the automatically segmenting; and transmitting the image that is selected using the compression algorithm to a second device.

18. The method of claim 17, wherein the second device comprises at least one of: an end point device or a storage device.

* * * * *